United States Patent
Addy et al.

(10) Patent No.: US 9,736,200 B2
(45) Date of Patent: Aug. 15, 2017

(54) SYSTEM AND METHOD OF VIDEO STREAMING

(71) Applicant: Honeywell International Inc., Morristown, NJ (US)

(72) Inventors: Kenneth L. Addy, Massapequa, NY (US); Piotr Romanczyk, Melville, NY (US); David S. Zakrewski, Babylon, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 216 days.

(21) Appl. No.: 14/549,703

(22) Filed: Nov. 21, 2014

(65) Prior Publication Data

US 2016/0149977 A1     May 26, 2016

(51) Int. Cl.
*G06F 15/16* (2006.01)
*H04L 29/06* (2006.01)
*H04N 7/18* (2006.01)

(52) U.S. Cl.
CPC ...... *H04L 65/4069* (2013.01); *H04L 65/4007* (2013.01); *H04N 7/181* (2013.01)

(58) Field of Classification Search
CPC .. H04L 65/4069; H04L 65/4007; H04N 7/181
USPC ......................................................... 709/231
See application file for complete search history.

(56) References Cited

U.S. PATENT DOCUMENTS

| | | | | |
|---|---|---|---|---|
| 7,839,926 B1* | 11/2010 | Metzger | .................. | H04N 5/144 375/240.01 |
| 8,589,987 B1* | 11/2013 | Lee | .................. | H04N 21/21805 370/332 |
| 8,830,296 B1* | 9/2014 | Vivekanandan | ....... | H04N 7/152 348/14.09 |
| 9,319,629 B1* | 4/2016 | Vivekanandan | ....... | H04N 7/147 |
| 2002/0003575 A1* | 1/2002 | Marchese | ........... | G06F 17/3025 348/231.99 |
| 2006/0232677 A1* | 10/2006 | Butaney | ............. | H04N 5/23203 348/207.1 |
| 2006/0271695 A1* | 11/2006 | Lavian | .................. | G06F 21/552 709/229 |
| 2007/0200914 A1* | 8/2007 | DuMas | ............ | G08B 13/19645 348/14.01 |

(Continued)

FOREIGN PATENT DOCUMENTS

| | | | | |
|---|---|---|---|---|
| WO | WO 96/24284 A1 | 8/1996 | | |
| WO | WO 2015099675 A1 * | 7/2015 | ............. | H04N 7/181 |

OTHER PUBLICATIONS

Extended European search report from corresponding EP patent application 15194405.5, dated Apr. 6, 2016.

*Primary Examiner* — Imad Hussain

(74) *Attorney, Agent, or Firm* — Husch Blackwell LLP

(57) ABSTRACT

A method and system are provided, wherein a user can log in to a first cloud based server using a selected communications device. Upon log in, a selected plurality of video cameras is activated to simultaneously provide respective streaming video from each of the selected plurality of video cameras to a second cloud based server. Upon designation of a first member of the selected plurality of video cameras, the first member streams the respective streaming video from the first member to a communications device of the user, and streaming from all other members of the selected plurality of video cameras is terminated.

10 Claims, 3 Drawing Sheets

(56) References Cited

U.S. PATENT DOCUMENTS

| | | | | |
|---|---|---|---|---|
| 2010/0232518 A1* | 9/2010 | Coleman, Sr. | H04N 7/181 | 375/240.26 |
| 2010/0304731 A1* | 12/2010 | Bratton | H04N 5/232 | 455/420 |
| 2011/0058036 A1* | 3/2011 | Metzger | H04N 7/181 | 348/143 |
| 2011/0119716 A1* | 5/2011 | Coleman, Sr. | H04N 7/181 | 725/62 |
| 2012/0113265 A1* | 5/2012 | Galvin | H04N 5/23206 | 348/159 |
| 2012/0262576 A1* | 10/2012 | Sechrist | H04N 21/21805 | 348/143 |
| 2014/0136701 A1* | 5/2014 | Billau | H04N 7/162 | 709/225 |
| 2014/0168453 A1* | 6/2014 | Shoemake | H04N 5/23206 | 348/207.11 |
| 2014/0237493 A1* | 8/2014 | Russo | H04N 7/181 | 725/5 |
| 2015/0022666 A1* | 1/2015 | Kay | H04L 67/025 | 348/159 |
| 2016/0294906 A1* | 10/2016 | Levinson | H04L 65/602 | |

\* cited by examiner

SYSTEM AND METHOD OF VIDEO STREAMING

FIELD

The application pertains to cloud based systems with reduced video setup time and reduced bandwidth requirements. More particularly, the application pertains to such systems and methods that attempt to shorten perceived setup time by responding to user login activity to make video streams from a plurality of cameras immediately available to an end client application while reducing bandwidth.

BACKGROUND

Internet cloud based video streaming has become a very popular and effective way to provide information and content to end users from a variety of sources. Unfortunately, the setup for Internet based camera streaming is a relatively time consuming process. There are usually multiple steps, such as discovering a network address of a camera, setting up the network (for example, a TCP handshake), and performing streaming negotiations or stream transcoding. Specifically, some video transport protocols require a video chunk to be prefetched on a relay server before it can be sent to a viewer (for example, HTTP live streaming). This can take a significant amount of time, for example, 15 seconds. This usually requires that the end user must wait for 15 seconds for actual video data arriving at his/her laptop or mobile application. Although 15 seconds is not a lot of time, many users view such delays as indicating less than ideal service performance.

Alternately, some of the known remote video transmission services stream video continuously and, therefore, consume valuable bandwidth associated with a site. This causes other Internet services to be sluggish or unresponsive in, for example, home installations.

One of the advantages of continuous streaming is that, when an end user logs in from a remote location, the video streams are "live," and the response is faster than other systems that only stream upon request in order to conserve bandwidth.

DETAILED DESCRIPTION

Figure 1:
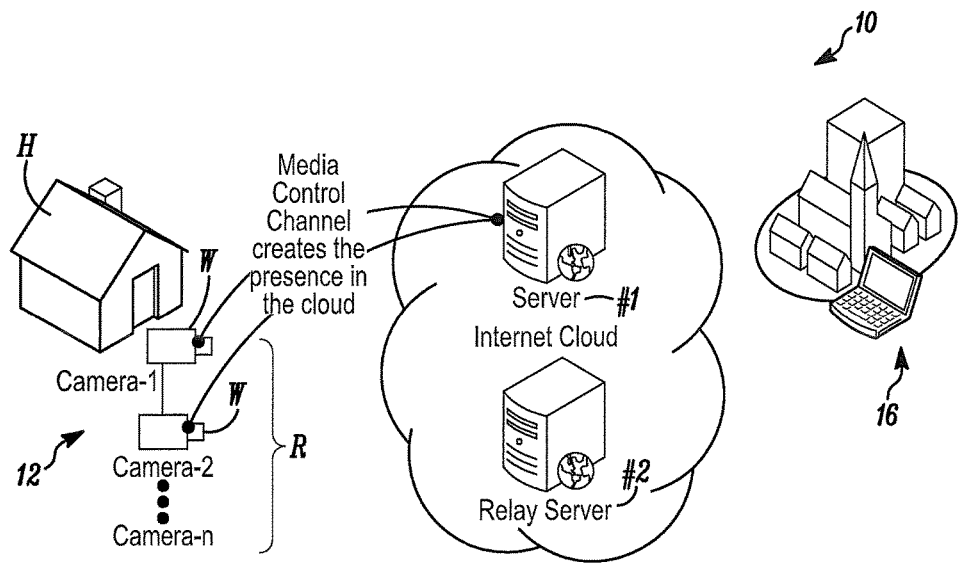
FIG. 1 illustrates a block diagram of a system in accordance herewith in a first state.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or the claims to the specific embodiment illustrated (including, but not limited to other streaming protocols and service components, such as presence and relay services, may be named differently). In this document, the function of presence services is to identify the Internet location of a camera device and verify the account authorization and authentication of an end user. The function of relay services is primarily to route a camera stream to one or more video consumers in cloud services.

In embodiments hereof, streaming is carried out for a limited period of time from all cameras after an initial connection from the end user. In this configuration, the end user is presented with live images from selected cameras immediately since all of the cameras are streaming live video simultaneously. When a camera is designated by the user, streaming from all of the undesignated cameras still continues until some predetermined time or is terminated immediately. With cameras streaming images temporarily on demand, bandwidth from the site is not appropriated by continuous, unneeded video streams. Thus, the responsiveness of a continuously streaming system is provided, but without bandwidth issues.

FIGS. 1-4 illustrate a system 10 and various aspects of a process of providing the responsiveness of continuously streaming video, but with advantageously reduced bandwidth requirements as discussed below. The system 10 provides video monitoring capabilities that could be installed in a home H or other building where such monitoring is needed. The location is exemplary and is not a limitation hereof.

A plurality of video-type cameras 12 can be installed in a region R of a home H, other building, or region R to be monitored. The members of the plurality 12, such as 12-1, 12-2 . . . 12-n, can be in a low power, non-streaming state. They are, however, coupled to a cloud based server, such as a server 1, that provides presence services. As those of skill will understand, the members of the plurality 12 are associated with the monitoring location, such as the home H, and this association is known to the server 1.

Figure 2:
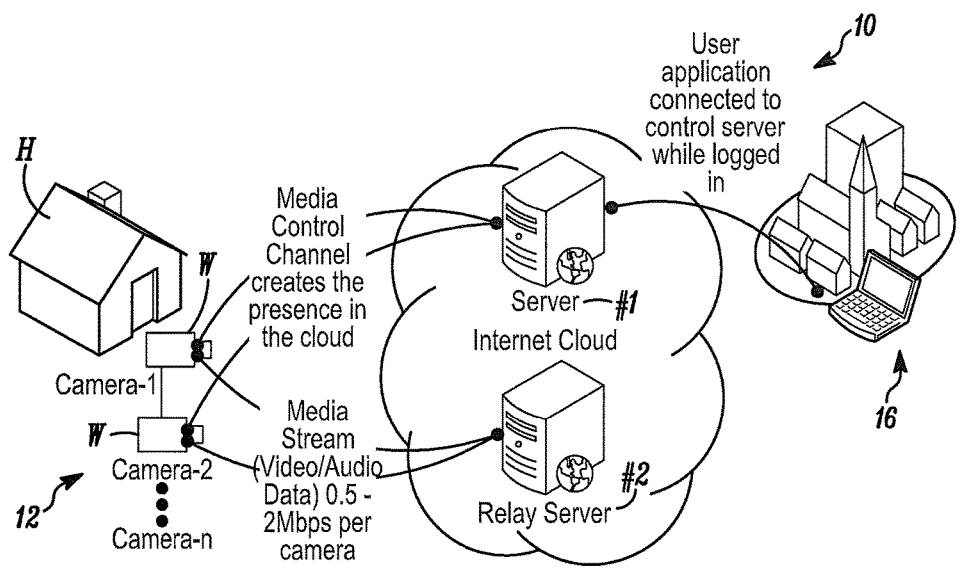
FIG. 2 illustrates the block diagram of FIG. 1 in a second state.

The present system and method enable an end-user, via a communications device 16, such as a pad computer, laptop, smart phone, or the like without limitation, to selectively and substantially immediately receive real-time streaming video after log in without a need to occupy all of the bandwidth required to have each of the unselected cameras 12-i streaming real-time video. Instead, as illustrated in FIG. 2, when the end user logs on via the unit 16 and the server 1, the cloud service anticipates that the user will want to stream from one or more of the cameras 12i of the plurality 12. Hence, to provide short wait times to the user and the unit 16, all of the members of plurality 12 initiate a streaming video feed to the server 2. This, of course, occupies substantial bandwidth.

Figure 3:
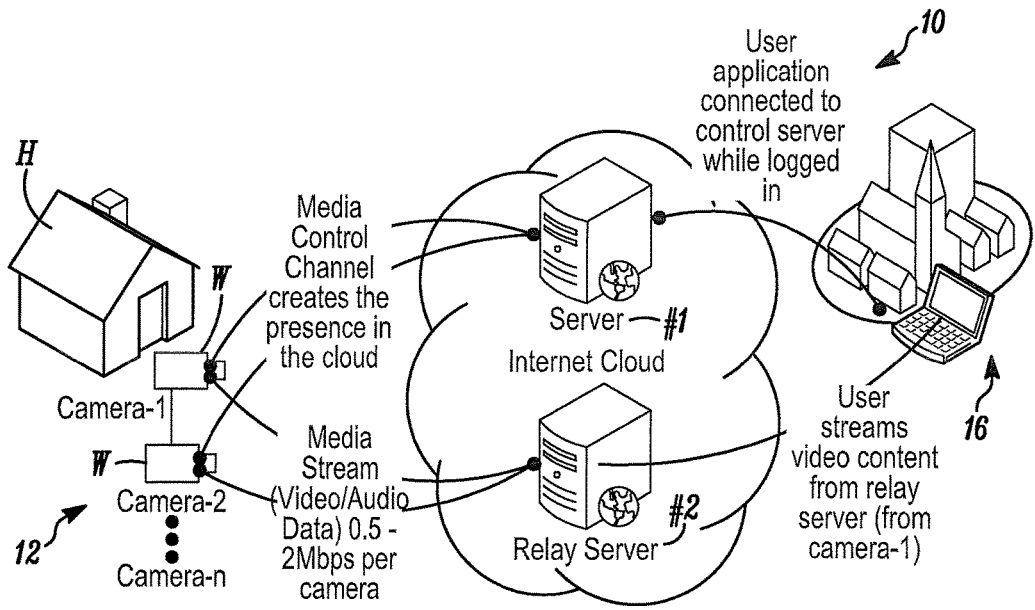
FIG. 3 illustrates the block diagram of FIG. 1 in a third state.

As illustrated in FIG. 3, after log in, the user, via the unit 16, selects a camera, for example, the camera 12-1 of the plurality 12, to present real-time streaming video to the exclusion of all other members of the plurality 12. Since all of the cameras 12i of the plurality 12 are streaming video to the server 2, video from the selected camera can immediately be provided to the unit 16 from the server 2. No set-up time is needed since all of the cameras of the plurality 12 are already streaming video.

Figure 4:
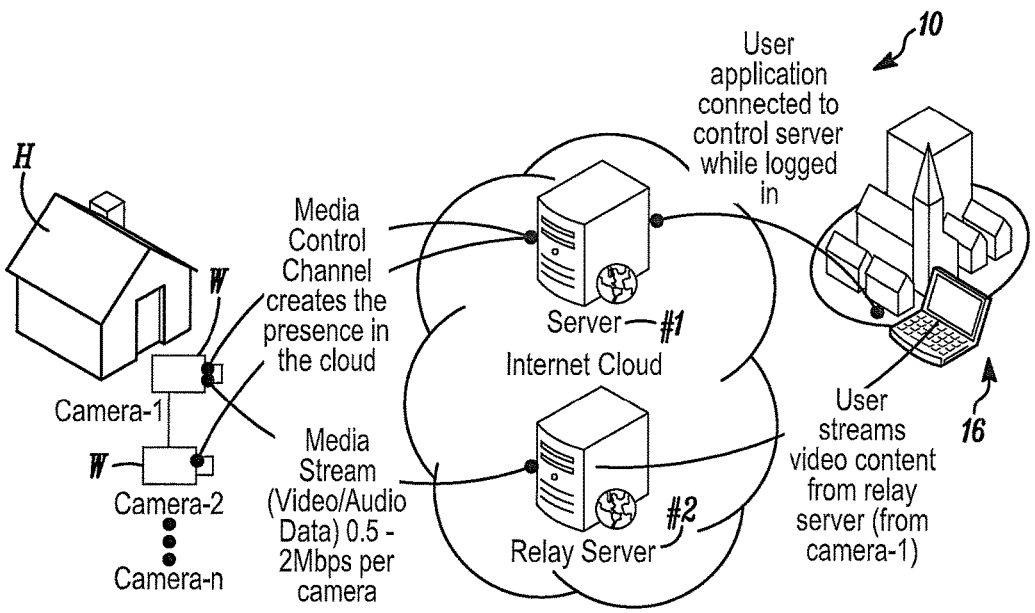
FIG. 4 illustrates the block diagram of FIG. 1 in a fourth state.
Figure 5:
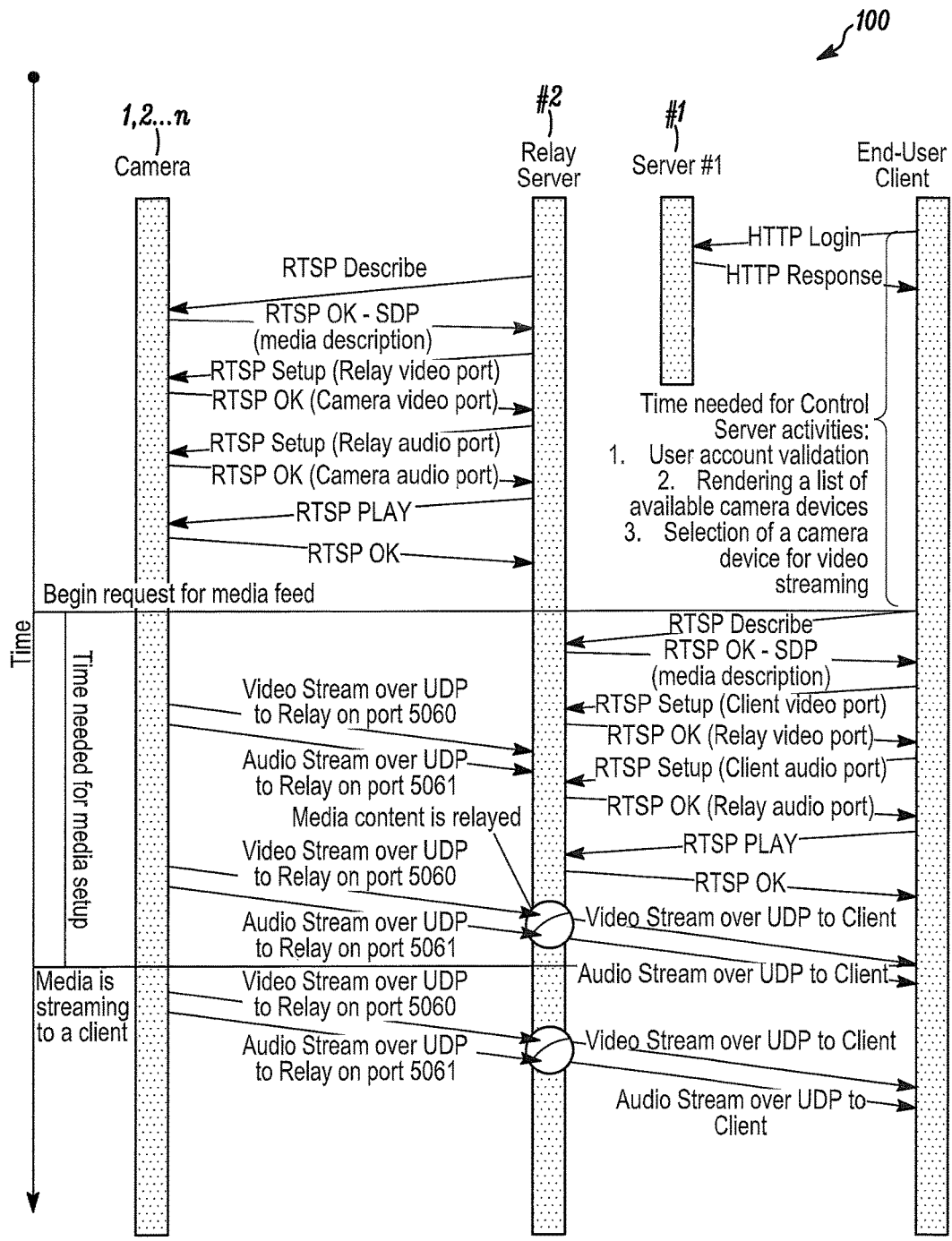
FIG. 5 illustrates a chart of actions to be taken to implement a process as illustrated in FIGS. 1-4.

As illustrated in FIG. 4, once the camera 12-1 has been selected via the unit 16, video streaming from all other cameras of the plurality 12 can be immediately terminated, thereby making that bandwidth available to other devices. In another configuration, more than one camera can be selected, and video streaming from all unselected cameras can be terminated immediately or within a user configureable timeout. FIG. 5 illustrates details of a process 100 that implements the above described processing of FIGS. 1-4.

In summary, systems and methods in accordance herewith foresee or anticipate the end user's intention of streaming video from a camera. Foreseeing and anticipating should not be limited to a login action. The present system and method shorten the setup time experienced by the user to provide a user friendly experience. Additionally, it does so without continually hogging bandwidth while the user is viewing output from a selected camera.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A process comprising:
   providing a plurality of network enabled video-type cameras;
   associating members of the plurality of network enabled video-type cameras with a predetermined user;
   receiving log in information associated with the predetermined user via a communications device;
   linking the log in information to the plurality of network enabled video-type cameras and simultaneously activating all members of the plurality of network enabled video-type cameras to immediately start streaming a video stream to a relay server;
   receiving, from the communications device, a first camera designation selecting a first subset of the plurality of network enabled video-type cameras;
   forwarding the video stream from the first subset of the plurality of network enabled video-type cameras to the communications device; and
   terminating the video stream for each of the plurality of network enabled video-type cameras not selected by the first camera designation.

2. The process as in claim 1 wherein bandwidth released by terminating the video stream for each of the plurality of network enabled video-type cameras not selected by the first camera designation is available for another application.

3. The process as in claim 2 further comprising receiving, from the communications device, a second camera designation selecting a second subset of the plurality of network enabled video-type cameras and streaming the video stream from the second subset of the plurality of network enabled video-type cameras to the communications device.

4. The process as in claim 1 further comprising:
   providing a cloud based control server; and
   coupling the members of the plurality of network enabled video-type camera to the cloud based control server, wherein the cloud based control server provides services to the members of the plurality of network enabled video-type cameras.

5. The process as in claim 4 further comprising providing control and monitoring circuits coupled to the plurality of network enabled video-type cameras so as to form a regional monitoring system.

6. An apparatus comprising:
   a plurality of video-type cameras;
   at least one server linked to the plurality of video-type cameras; and
   a communications device,
   wherein the at least one server is linked at least intermittently to the communications device, and simultaneously therewith, all of the plurality of video-type cameras are activated by the at least one server to stream video streams requiring a first bandwidth to the at least one server,
   wherein the communications device specifies at least one of the plurality of video-type cameras to continue streaming, and
   wherein the at least one server forwards the video streams of the at least one of the plurality of video-type cameras to the communications device and terminates the video streams of remaining members of the plurality of video-type cameras such that the video streams of the at least one of the plurality video cameras are streamed at a second, reduced bandwidth.

7. The apparatus as in claim 6 further comprising control and monitoring circuits coupled to the plurality of video-type cameras so as to form a regional monitoring system.

8. The apparatus as in claim 6 further comprising a second server that provides services to the plurality of video-type cameras.

9. The apparatus as in claim 8 wherein the at least one server and the second server are coupled to the plurality of video-type cameras via a computer network and a cloud based service.

10. A system comprising:
    a cloud based server;
    a plurality of video cameras coupled to the cloud based server; and
    a communications device intermittently coupled to the could based server,
    wherein the communications device, when coupled to the cloud based server, logs in to the cloud based server, and simultaneously therewith, the cloud based server activates each of the plurality of video cameras to stream a respective video stream to a relay server,
    wherein the communications device selects at least one of the plurality of video cameras to stream the respective video stream, and
    wherein the cloud based server directs the relay server to forward the respective video stream of the at least one of the plurality of video cameras to the communications device and directs other members of the plurality of video cameras to terminate streaming the respective video stream to the relay server.

* * * * *